United States Patent Office 3,264,104

Patented August 2, 1966

3,264,104

REVERSAL-DEVELOPMENT PROCESS FOR REPRODUCTION COATINGS CONTAINING DIAZO COMPOUNDS

Maximilian Karl Reichel, Wiesbaden-Biebrich, Germany, assignor, by mesne assignments, to Azoplate Corporation, Murray Hill, N.J.

No Drawing. Filed July 25, 1962, Ser. No. 212,437
Claims priority, application Germany, July 28, 1961, K 44,366
12 Claims. (Cl. 96—33)

This invention relates to a process for the reversal development of light-sensitive coatings which contain diazo compounds and which are particularly suitable for the preparation of printing plates for duplicating purposes.

In the reversal development process, a coating including at least one compound which contains the naphthoquinone-(1,2)-diazide residue (o-diazo-naphthol residue) and at least one film-forming thermoplastic substance of high molecular weight and having oxygen in the molecule, is exposed imagewise, the image surface is subjected to a fixing process and may be dried, the whole light-sensitive coating is exposed by a second exposure and the parts of the coating not affected by the light during the first exposure are then removed by means of an alkaline developer.

Suitable light-sensitive coatings for this process are those which contain one or more o-quinone diazide compounds, such as are described in U.S. Patents Numbers 3,046,118; 3,102,809; 3,106,465; 3,130,047; 3,130,048; 3,148,983; 3,061,430; 3,184,310; 3,188,210; and 3,201,239. The o-naphthoquinone diazide-(1,2)-sulfonic acid esters with various aromatic mono- or multi-nuclear compounds containing hydroxyl groups are preferably used.

In the light-sensitive coating there is, in addition to the diazo compound, a film-forming thermoplastic substance containing oxygen in the molecule, e.g., cellulose ethers such as ethyl or benzyl cellulose, polyvinyl esters such as polyvinyl acetate, polyvinyl acetobutyrate, polyvinyl butyrate and polyvinyl propionate or polyvinyl acetals, e.g., polyvinyl formal or polyvinyl butyral. Mixtures of such thermoplastic substances may also be used. Those advantageously used are primarily the types with very high molecular weight, e.g., a polyvinyl acetate with an average molecular weight of from about 500,000 to more than 2,000,000. These substances are mixed into the coatings in quantities of 0.01 to 3 parts by weight, preferably 0.5 to 1.5 parts by weight, to each part by weight of diazo compound. Resins, also, may be contained in the coating. Those preferred are alkali-soluble novolak-type phenol resins resistant to strong inorganic acids as listed in Karsten's "Lackrohstoff-Tabellen" (Tables of Starting Materials for Lacquers), 2nd edition, 1959, p. 106. These are those known as spirit-soluble phenol- or cresol-formaldehyde resins.

If the fixing process hereinafter described is performed with the aid of alkaline solutions, possibly at moderately increased temperature, it can also be advantageous for salts of multivalent metals to be incorporated in the light-sensitive coating, particularly if the method of working is such that o-hydroxyazo dyestuffs are formed from the naphthoquinone-(1,2)-diazide compounds as a result of a partial bleaching-out process, preferably of half the full duration. These multivalent metal salts are capable of complexing with the o-hydroxyazo dyestuffs, to form a lacquer, and hence contribute to the anchoring of the image. Examples of suitable salts are: copper-II-chloride, nickel chloride, zinc chloride, aluminum chloride and iron-III-chloride. They are incorporated in the coatings in quantities amounting to 0.01 to 0.75 part by weight to each part by weight of light-sensitive substance.

The light-sensitive coatings are applied, in a relatively thin uniform layer, to a support that is suitable for printing purposes, e.g., paper, a laminate of paper and plastic, or plastic alone such as cellulose hydrate, cellulose acetate, polyterephthalic acid glycol ester or synthetic polyamide, or metals such as aluminum, iron, copper, magnesium or zinc. A material which can be utilized for reversal development is thereby obtained.

First of all, imagewise exposure is effected by means of a powerful light source of suitable type, the procedure whereby the master is in contact with the material being used, for example.

A fixing treatment is then effected, the purpose of which is that the coated surface affected by the light shall be altered in such a way that it is not attacked by the dilute alkaline developer solutions to be used at a later stage in the reversal development process. One way in which this fixing process can be performed comprises treating the exposed material with a suitable alkaline solution. The temperature and method of treatment is advantageously varied according to the alkali used. For example, if a dilute aqueous caustic alkali solution is used, e.g., a solution containing 1 to 10 (preferably 2.5 to 5) parts by weight of potassium, sodium or lithium hydroxide to the liter, the exposed coating can be adequately fixed within 1 to 10 minutes, preferably 3 to 5, at room temperature (18 to 22° C.). Instead of these caustic alkali solutions, other strong alkaline solutions can be used at room temperature, e.g., mixtures of 55–60 parts by weight of sodium metasilicate ($Na_2SiO_3 \cdot 9H_2O$) and 33–37 parts by weight of trisodium phosphate $$(Na_3PO_4 \cdot 12H_2O)$$

to the liter. If substances that are less strongly alkaline and which do not exert adequate fixing action at room temperature, e.g., aqueous solutions of secondary or tertiary sodium phosphate, are used at elevated temperature, e.g., 30 to 100° C., the exposed coating can be adequately fixed even with solutions of salts of this type. For example, aqueous alkaline solutions can be used which contain 25–70 (preferably 25–50) parts by weight of secondary sodium phosphate ($Na_2H \cdot PO_4 \cdot 12H_2O$) or 20–60 (preferably 30–50) parts by weight of trisodium phosphate ($Na_3PO_4 \cdot 12H_2O$)—in this case however only at temperatures up to about 25–30° C.—or 1–6%, preferably 2.5–5%, of sodium carbonate or sodium bicarbonate.

The duration of treatment in the alkaline bath, being dependent on temperature, varies. It ranges from about 10 seconds to 5 minutes. For the preparation of the reversal image, the light-sensitive coating may be entirely bleached out when exposed imagewise, i.e., all the diazo compound in the parts affected by the light is converted into the light-decomposition product, or the exposure may be only partial, in which case it is preferable for an exposure of half the full bleaching-out time to be employed. In the latter case, in the parts affected by the light, what are known as the "Belichtungsfarbstoffe," as described in Liebig's Annalen, 556 pp. 65, 85 (1944), are produced, as a result of the subsequent treatment with alkali, from the parts of the light-sensitive coating still not bleached out and the light-decomposition products. Thus, a colored negative image of the positive master becomes visible.

After the fixing treatment, excess developer solution is rinsed away with running water and drying is performed at 80 to 100° C. Instead of the alkaline solutions, even water can be used for the fixing process at increased temperature. For this purpose the exposed coating is immersed for one to sixty minutes, preferably five to thirty minutes, in hot water (80 to 100° C. and preferably practically boiling). When the material is removed from the hot water, the small amount of water adhering thereto will generally evaporate off of its own accord; otherwise a special drying process can be employed. At this stage, the material is exposed again without a master and this time until bleaching-out is complete. The parts of the coating hitherto unaffected by the light are thereby altered so that they can be removed by the usual treatment with an aqueous alkaline developer, e.g., wiping over with a cotton pad, a plush swab or a cellulose sponge. Only those parts of the coating will be removed which were not affected by the light during the original exposure because the fixing treatment has so modified the parts exposed to light during the original exposure that they remain adherent to the support. Thus, a reversal image of the original master is obtained.

For the alkaline developer, those such as are available, for example, for the development of offset printing foils may be utilized. Suitable developers are also constituted by the alkaline-acting substances named above. They are preferably used in great dilution.

While the diazo-type coatings hitherto known give either a positive or a negative of the master, a process is provided by the present invention whereby both positive and negative copies of a master can be prepared with one coating. This is particularly advantageous in view of the fact that the o-quinone diazide compounds, such as are described above, having very good storageability and printing plates which give long runs can be prepared with them. The o-quinone diazides give positive copies of the master if processed in the usual manner. With the process herein described, the superior properties of this normally positive-working coating can be utilized also for the preparation of negative copies of a master. The light-sensitive coatings are suitable, when applied, for example, to metal supports, for the preparation of printing plates for relief printing, intaglio printing, planographic and offset printing. They have the advantage that they do not need to be again heated ("baked") before the etching process.

In the above, 1 part by weight to the liter corresponds to 1 gram per liter.

The invention will be further illustrated by reference to the following specific examples in which one part by volume corresponds to 1 $cm.^3$ if 1 gram is considered as one part by weight:

*Example I*

1.5 parts by weight of polyvinyl acetate with a molecular weight of about 2,000,000 ("Mowilith" 90) and 10 parts by weight of a m-cresol-formaldehyde novolak ("Alnovol" 429K) are dissolved in 100 parts by volume of ethylene glycol monoethyl ether. With mechanical stirring, 3 parts by weight of 2,3,4-trihydroxy-benzophenone-naphthoquinone-(1,2)-diazide-(2)-4- (or 5) sulfonic acid ester and 0.5 part by weight of the dyestuff Sudan Blue II (Color Index, Solvent Blue 35, vol. II, p. 2883) or 0.5 part by weight of Sudan Red G (Color Index, Solvent Red 1, vol. II, p. 2893, Color Index 12, 150) are added. The filtered solution is then coated upon a clean, degreased, polished zinc plate and the light-sensitive coating is dried in hot air. For the preparation of a printing plate for book or newspaper printing, a photographic negative is used and exposure is effected with a powerful light source, e.g., an 18-amp enclosed carbon arc lamp, at a distance of 65 to 70 cm. from the master, the duration being about 2.5 minutes.

The exposed zinc plate is placed in an aqueous alkaline developer solution containing, per liter, 5 parts by weight of sodium hydroxide or 60 parts by weight of sodium metasilicate ($Na_2SiO_3.9H_2O$) and 37 parts by weight of trisodium phosphate ($Na_3PO_4.12H_2O$), or a mixture of equal parts by volume of the two developer solutions, and it is left standing for about one minute. It is then rinsed thoroughly with running water, dried well with hot air, and then bleached out a second time, without the master, this time completely. Afterwards, treatment is performed with the aqueous alkaline developer solution specified above, with the aid of a cotton pad wetted therewith, whereby the parts of the coating that were not affected by the first, imagewise exposure, and these parts only, are removed. A reversed image is obtained.

If the same light-sensitive coating is used, but without the polyvinyl acetate, a reversal image cannot be obtained, but only a negative from a negative photographic master, although the working conditions employed are otherwise the same.

For the preparation of a zinc block, deep-etching is effected either by the usual multistage process or by the modern single-stage method, without previous burning-in with dilute nitric acid being necessary.

Instead of 3 parts by weight of 2,3,4-trihydroxy-benzophenone-naphthoquinone-(1,2)-diazide-(2)-4 (or 5) sulfonic acid ester, the same number of parts by weight of the condensation product from 1 mole of 2,7 (or 1,7)-dihydroxynaphthalene or 1 mole of 2,2',4,4'-tetrahydroxydiphenyl or 1 mole of 2,2'-dihydroxy-1,1'-dinaphthyl methane with 2 moles of a diazonaphthol sulfonyl chloride (naphtho-quinone-(1,2)-4 (or 5)-sulfonyl chloride can be used with similar results. Instead of a zinc plate, a superficially roughened aluminum plate or a copper plate, for example, may be used with similar results.

*Example II*

The procedure described in Example I is followed, but instead of the developer solution therein employed at 18–22° C., a solution which contains 50 parts by weight of secondary sodium phosphate ($Na_2HPO_4.12H_2O$) or 2.5 parts by weight of sodium carbonate to the liter is used at moderately elevated temperature (about 60° C.). If, instead of secondary sodium phosphate, a solution of about the same concentration of trisodium phosphate is used, a reversal image is obtained, provided the temperature of the aqueous alkaline bath does not rise above 25° C. A reversal image that is used as a printing plate for relief printing and book printing is obtained.

*Example III*

1.0 to 1.5 parts by weight of polyvinyl acetate ("Mowilith" 90) are dissolved in 100 parts by volume of ethylene glycol monoethyl ether. With mechanical stirring, 1.5 parts by weight of 2,3,4-trihydroxybenzophenone-napthoquinone-(1,2)-diazide-(2)-5-sulfonic acid ester, 1.5 parts by weight of 2,3,4-trihydroxy-benzophenone-naphthoquinone-(1,2)-diazide-(2)-5-sulfonic acid-bis-ester and 0.5 part by weight of the dyestuff Sudan Blue II are added. The solution is filtered and then coated upon a roughened aluminum foil and dried with hot air. The coating is then exposed under a photographic negative until half only of the diazo compound is converted into its light-decomposition product. For the production of the "Belichtungsfarbstoff," the material is placed in an aqueous alkaline developer solution made up of a mixture of sodium metasilicate and trisodium phosphate (cf. Example I) and left standing (about 1 minute) until the dyestuff is clearly seen and deepening of the color ceases. Excess developer solution is rinsed off in running water and the plate is dried in hot air. It is then fully bleached out (about 5 minutes) without any master being used, after which it is treated with a 5% trisodium phosphate solution $(Na_3PO_4.12H_2O)$ with the aid of a cotton pad, only the parts of the coating not containing the dyestuff being thereby removed. A reversal image is obtained.

If the same light-sensitive coating is used without the addition of the polyvinyl acetate of high molecular weight ("Mowilith" 90) and exactly the same conditions are adhered to, not a reversal image but a negative image from a negative photographic master is obtained. The reversal image produced on the aluminum foil is inked up in the usual way with greasy ink and fixing solution and serves as a printing plate for planographic and offset printing. Instead of 1.5 parts by weight of 2,3,4-trihydroxybenzophenone naphthoquinone-(1,2)-diazide-(2)-4 (or 5)-sulfonic acid ester and 1.5 parts by weight of 2,3,4-trihydroxybenzophenone naphthoquinone-(1,2)-diazide-(2)-4 (or 5)-sulfonic acid bis ester, 3 parts by weight of the condensation product from 1 mole of 2,4,2',4'-tetrahydroxy-6,6'-dimethyl-diphenylmethane and 2 moles of a naphthoquinone-(1,2)-diazide-(2)-4 (or 5)-sulfonyl chloride can be used with equivalent results.

*Example IV*

The procedure described in Example III is followed, but instead of the developer solution therein used at 18–22° C., a solution containing 50 parts by weight of secondary sodium phosphate ($Na_2HPO_4.12H_2O$) to the liter is used at moderately increased temperature (about 70° C.). A reversal image is obtained which can be used as a printing plate in planographic and offset printing.

*Example V*

1.5 parts by weight of polyvinyl acetate of high molecular weight ("Mowilith" 90) and 10 parts by weight of a m-cresol formaldehyde novolak ("Alnovol" 429K) are dissolved in 100 parts by volume of ethylene glycol monoethyl ether. 0.5 part by weight of Sudan Blue II and 3 parts by weight of 2,3,4-trihydroxybenzophenone naphthoquinone-(1,2)-diazide-(2)-4 (or 5)-sulfonic acid ester are added. The solution is filtered and then coated upon a copper plate that has been polished smooth. The material is then exposed behind a diapositive for as long as is necessary for the "Belichtungsfarbstoff" to be produced by coupling (about half the bleaching-out time). To effect coupling, the copper plate is placed in an aqueous alkaline developer solution as in Example I and left there until the formation of the dyestuff is clearly seen and color-deepening ceases (about one minute).

Excess developer solution is then rinsed away thoroughly in running water and the plate is dried with hot air. Complete bleaching-out is then effected without any master being used and the plate is treated, with the aid of a cotton pad, with the aqueous alkaline developer solution described in Example I, as a result of which only the parts of the coating not containing the dyestuff are removed. A reversal image is obtained.

If the same light-sensitive coating is used, but without the addition of the polyvinyl acetate of extremely high molecular weight, and exactly the same conditions of work are adhered to, not a reversal image, but a positive image is obtained. The copper surface that is now bared imagewise is suitably deep-etched at 20 to 22° C. with an iron-III-chloride solution of 40° Bé. A printing plate for intaglio printing is obtained. Instead of "Mowilith" 90, "Mowilith" 70 (molecular weight: about 1,000,000) can be used.

Instead of 3 parts by weight of 2,3,4-trihydroxybenzophenone naphthoquinone-(1,2)-diazide-(2)-4 (or 5)-sulfonic acid ester, 3 parts by weight of the condensation product from 1 mole of 2,2'-dihydroxy-diphenyl and 1 mole of a naphthoquinone-(1,2)-diazide-(2)-4 (or 5)-sulfonyl chloride or 1 mole of 1,2-dihydroxyanthraquinone and 1 mole of a naphthoquinone-(1,2)-diazide-(2)-4 (or 5)-sulfonyl chloride may be used with equivalent results.

*Example VI*

The procedure described in Example V is followed but instead of the developer solution therein used at 18 to 22° C., a solution containing 60 parts by weight of secondary sodium phosphate ($Na_2HPO_4 \cdot 12H_2O$) to the liter is employed at moderately increased temperature (about 50° C.). A reversal image is obtained which can be used as a printing plate for intaglio printing.

*Example VII*

The procedure described in Example V is followed but, instead of the copper plate, a bimetal foil of aluminum and copper is used. A negative photographic master being used, the "Belichtungsfarbstoff" is produced by an exposure lasting half the time that would be necessary for the coating to be completely bleached out followed by the placing of the bimetal foil in an aqueous alkaline developer solution (as described in Example I), where it is left standing until the formation of the dyestuff is clearly to be seen (about 1 minute) and color-deepening ceases. Excess developer solution is then rinsed away thoroughly with running water and the plate is dried in hot air. Complete bleaching-out is now effected without any master being used and the plate is afterwards treated with a 1% sodium hydroxide solution with the aid of a cotton pad, as a result of which the parts of the coating that do not contain the dyestuff, and these parts only, are removed. A reversal image is obtained.

If the same light-sensitive coating is used but without the addition of the polyvinyl acetate of extremely high molecular weight and conditions of operation are the same, not a reversal image but a negative image is obtained (with a negative photographic master). The copper surface, now bared imagewise, is etched at 20 to 22° C. with an iron nitrate solution containing 160 parts by weight of $Fe(NO_3)_3 \cdot 9H_2O$ in 100 parts by volume of water. A printing plate for planographic and offset printing is obtained. Instead of aluminum-copper a bimetal foil of steel and copper can be used with equally good results.

Instead of the light-sensitive compounds of Example V, 3 parts by weight of the condensation product from 1 mole of purpurogallin and 1 mole of naphthoquinone-(1,2)-diazide-(2)-4 (or 5)-sulfonyl chloride or 1 mole of phloroglucinol and 1 mole of naphthoquinone-(1,2)-diazide-(2)-4 (or 5)-sulfonyl chloride can be used with equivalent results.

*Example VIII*

The procedure described in Example V is followed but 0.5 to 1.0 part by weight of cupric chloride is added to the light-sensitive solution and, instead of the copper plate, a metal foil consisting of aluminum, copper and chromium layers is used. With a diapositive as master, the "Belichtungsfarbstoff" is produced by an exposure lasting about half the time necessary for the coating to be completely bleached out followed by the placing of the trimetal foil in an aqueous, approximately 0.5% sodium hydroxide solution, where it is left standing only until the formation of dyestuff is clearly seen (about 1 minute) and color-deepening ceases. The plate is then rinsed thoroughly with running water and dried with hot air. Without a master being used, the material is now fully bleached out and then treated with 0.5% sodium hydroxide solution with the aid of a cotton pad, as a result of which only the parts of the coating that do not contain dyestuff lacquerized with copper are removed. A reversal image is obtained. If a negative photographic master is used instead of the diapositive and if, as provided by the invention, the process is carried out so that the "Belichtungsfarbstoff" can be formed as a result of an exposure lasting half the bleaching-time, a reversal image is likewise obtained.

If the same light-sensitive solution is used without the polyvinyl acetate of extremely high molecular weight being added and conditions of work are otherwise the same, not a reversal image but an image corresponding to the master is obtained. The chromium surface which is now bared imagewise is etched away by means of a mixture consisting of calcium chloride, glycerine and hydrochloric acid, e.g., in accordance with the method of U.S. Patent 6,287,345, so that the copper surface beneath the chromium layer is not affected. A printing plate for planographic and offset printing is obtained in which the printing elements consist of copper while the non-printing areas consist of chromium.

*Example IX*

The procedure described in Example VIII is followed, but about 0.5 part by weight of nickel chloride or about 0.5 part by weight of zinc chloride is further added to the light-sensitive solution and a copper foil of a thickness of about 30 to 70μ, laminated to a synthetic foil which is not electrically conductive, is used as a support. After the material has been given an exposure under a photographic negative which will be adequate for the "Belichtungsfarbstoff" to be formed after treatment with aqueous alkaline developer solutions, the excess solution is rinsed away thoroughly with running water and drying is effected with hot air. Without a master being used, the material is now fully bleached out and then treated with an approximately 0.5% sodium hydroxide solution, with the aid of a cotton pad moistened therewith, as a result of which only the parts of the coating that do not contain dyestuff lacquerized with nickel or zinc are removed. A reversal image (positive) is obtained.

If with the same conditions of operation the same light-sensitive solution is used, but without the polyvinyl acetate of extremely high molecular weight being added, not a reversal image but the corresponding negative image is obtained. The copper surface that has been bared is etched away at room temperature with an iron-III-chloride solution of 40° Bé. A printed circuit for the conduction of electric current is obtained. Instead of a non-conductive plastic plate, a transparent or matted plastic foil provided by vacuum-deposition with a metal surface (of a thickness of 1μ, for example) can be used as a support with equally good results. Component parts for electrical construction are obtained.

*Example X*

The procedure described in Example V is followed, but instead of the copper plate, a superficially saponified cellulose acetate foil is used. With a photographic negative as master, either the material is given an exposure which will be sufficient for the "Belichtungsfarbstoff" to be formed as a result of coupling in an alkaline medium (half bleaching-out time) or it is preferably fully bleached out. The exposed foil is now placed in an aqueous alkaline solution (18–22° C.), as described in Example I, and left there until the formation of the "Belichtungsfarbstoff" or of the colored image of the light-decomposition product is clearly to be seen and color-deepening ceases (about 1 to 5 minutes). Excess developer solution is then thoroughly rinsed away with running water and the cellulose acetate foil is dried with hot air. Without a master being used, the material is now fully bleached out and then immersed in a batch of an aqueous solution (e.g., 5%) of secondary sodium phosphate for at least 3 minutes and the parts of the coating which were not affected by light until the material was exposed without a master are removed with the aid of a cotton pad. A reversal image is obtained.

If with the same conditions of operation the same light-sensitive solution is used without the polyvinyl acetate of high molecular weight being added, not a reversal image, but, for example, with a negative photographic master, a negative image results. A printing plate for planographic and offset printing is obtained.

*Example XI*

1.5 parts by weight of polyvinyl acetate ("Mowilith" 90), 3 parts by weight of 2,3,4-trihydroxybenzophenone naphthoquinone-(1,2)-diazide-(2) - 5 - sulfonic acid ester and 0.5 part by weight of Sudan Blue II are dissolved in 100 parts by volume of toluene. The solution is filtered and coated upon a superficially saponified cellulose acetate foil which is laminated, for example, to paper board. With a photographic negative as master, either the material is given an exposure of a duration such as is necessary for optimum formation of the "Belichtungsfarbstoff" as a result of coupling in an alkaline medium (half bleaching-out time) or it is preferably fully bleached out. The exposed foil is now placed in an aqueous alkaline solution (18–22° C.), as described in Example I, and left there until the formation of the "Belichtungsfarbstoff" or of the colored image of the light-decomposition product is clearly seen and color-deepening ceases (1–5 minutes). Excess developer solution is now rinsed away thoroughly with running water and the foil is dried with hot air. Without a master being used, the material is now fully bleached out and then immersed for about 3 minutes in a bath of a 5% aqueous solution of secondary sodium phosphate and the parts of the coating which were not affected by light until the material was exposed without the master are removed with the aid of a cotton pad. A reversal image is obtained.

*Example XII*

1.5 parts by weight of polyvinyl acetate ("Mowilith" 90), 3 parts by weight of 2,3,4-trihydroxybenzophenone-naphthaquinone-(1,2)-diazide-(2)-5-sulfonic acid ester and 0.5 part by weight of Sudan Blue II are dissolved in 100 parts by volume of ethylene glycol monoethyl ether. The solution is filtered and coated upon a transparent polyethylene terephthalate foil. With a photographic negative as master, either the material is given an exposure of a duration such as is necessary for optimum formation of the "Belichtungsfarbstoff" as a result of coupling in an alkaline medium (half bleaching-out time) or it is preferably fully bleached out. The exposed foil is now placed, as described in Example I, in an aqueous alkaline solution (18–22° C.) and left there until the formation of the "Belichtungsfarbstoff" or of the colored image of the light-decomposition product is clearly seen and color-deepening ceases (1–5 minutes). Excess developer solution is then rinsed away thoroughly with running water and the foil is dried with hot air. Without a master being used, the material is now fully bleached out and then immersed for about 3 minutes in a bath of, e.g., 5% aqueous solution of secondary sodium phosphate. With the aid of a cotton pad, the parts of the coating are removed which were not affected by light until the material was exposed without a master. A reversal image is obtained. Instead of the polyethylene terephthalate foil, a transparent cellulose acetate foil can be used with equivalent results.

*EXAMPLE XIII*

The procedure described in Example XII is followed but, instead of the developer solution there used at 18–22° C., a solution containing 50 parts by weight of secondary sodium phosphate ($Na_2HPO_4.12H_2O$) to the liter is used at moderately increased temperature (about 60° C.). A reversal image is obtained.

*Example XIV*

3 parts by weight of 2,3,4-trihydroxybenzophenone-naphthoquinone-(1,2)-diazide-(2)-4 (or 5)-sulfonic acid ester and 0.5 part by weight of the dyestuff Sudan Blue I (Color Index, Solvent Blue 35, vol. II, p. 2883) are dissolved in 100 parts by weight of ethylene glycol monoethyl (or methyl) ether. The filtered solution is coated upon a clean, degreased and polished zinc plate and the light-sensitive coating is dried with hot air or at, e.g., 80° C. in a drying cupboard. For the preparation of the reversal image, the material is exposed for 2.5 to 5 minutes, with a photographic negative as master, to a suitable light source, e.g., an 18-amp enclosed carbon arc with a distance of about 65 cm. between the light source and the master. The exposed zinc plate is then placed for about 30 minutes in hot water at 95 to 100° C. and then exposed to light again for about 5 minutes without a master being used. The plate is then developed with an aqueous alkaline developer solution containing 55 to 60 parts by weight of sodium metasilicate ($Na_2SiO_3.9H_2O$) and 33 to 37 parts by weight of trisodium phosphate ($Na_3PO_4.12H_2O$)

per liter. For this purpose, the exposed material is placed for 1 to 2 minutes in the aqueous alkaline bath and then the surface is treated with a cotton pad, plush swab or cellulose hydrate sponge. Only the parts of the coating are removed which were not affected by the light during the first, imagewise, exposure. A reversal image is obtained.

Instead of 3 parts by weight of 2,3,4-trihydroxybenzophenone-naphthoquinone - (1,2)diazide-(2)-4 (or 5)-sulfonic acid ester the same quantity by weight of the condensation product from 1 mole of 2,7-dihydroxy-naphthalene or 1 mole of 2,2′,4-4′-tetrahydroxydiphenyl or 1 mole of 2,2′-dihydroxy-1,1′-dinaphthyl methane with 2 moles of a diazonaphtholsulfonyl chloride (naphthoquinone-(1,2)-4 (or 5)-sulfonyl chloride) can be used with equivalent results. Instead of a zinc plate, a superficially roughened almuinum plate or a copper plate, for example, can be used with equivalent results.

*Example XV*

10 parts by weight of a m-cresol formaldehyde novolak ("Alnovol" 429K) are dissolved in 100 parts by volume of ethylene glycol monoethyl ether. With mechanical stirring, 3 parts by weight of 2,3,4-trihydroxybenzophenone naphthoquinone - (1,2)-diazide-(2)-4 (or 5)-sulfonic acid ester and 0.5 part by weight of the dyestuff Sudan Blue II are added and the filtered solution is coated upon a clean, degreased and polished zinc plate. The light-sensitive coating is dried with hot air or in a drying cabinet at, e.g., 80° C. For the preparation of the reversal image, the material is first exposed for about 5 minutes, with a photographic negative as master, to a suitable light source, e.g., an 18-amp enclosed carbon arc with a distance of about 65 cm. between the light source and the master and is then placed for about 30 minutes in water at a temperature of 95 to 100° C. The material is again exposed, this time without a master, and is bleached out completely. It is then placed in an aqueous alkaline developer solution containing, per liter 55 parts by weight of sodium metasilicate ($Na_2SiO_3 \cdot 9H_2O$)

and 37 parts by weight of trisodium phosphate ($Na_3PO_4 \cdot 12H_2O$)

or a mixture of equal parts by volume of this developer solution and a solution containing 5 parts by weight of sodium hydroxide per liter. It is left standing for about one minute and, with the aid of a cotton pad, a plush swab or a cellulose hydrate sponge, the parts of the coating are removed which were not affected by the light during the first, imagewise exposure. A reversal image is obtained. If the same light-sensitive coating is used, but the fixing treatment omitted, a reversal image is not obtained.

Instead of 3 parts by weight of 2,3,4-trihydroxybenzophenone-naphthoquinone - (1,2)diazide-(2)-4 (or 5)-sulfonic acid ester, the same quantity by weight of the condensation product from 1 mole of 2,2-dihydroxy-1,1′-dinaphthylmethane with 2 moles of a naphthoquinone-(1,2)-4 (or 5) sulfonyl chloride, the condensation product from 1 mole of purpurogallin and 1 mole of naphthoquinone-(1,2)-diazide-(2)-4 (or 5)-sulfonic acid chloride or the condensation product of 1 mole of phloroglucinol and 1 mole of naphthoquinone-(1,2)-diazine-(2)-4 (or 5)-sulfonic acid chloride may be used with equivalent results.

For the preparation of a zinc block, suitable deep etching is carried out either by the usual multistage process or by the modern single-step method without any prior burning-in with nitric acid being necessary.

*Example XVI*

0.5 to 1.5 parts by weight of polyvinyl acetate ("Mowilith" 90) are dissolved in 100 parts by volume of ethylene glycol monomethyl (or ethyl) ether and, with mechanical stirring, 1.5 parts by weight of 2,3,4-trihydroxybenzophenone-naphthoquinone-(1,2)-diazide-(2)-4 (or 5)-sulfonic acid ester, 1.5 parts by weight of 2,3,4-trihydroxybenzophenone - naphthoquinone-(1,2)-diazide-(2)-4 (or 5)-sulfonic acid-bis-ester and 0.5 part by weight of the dyestuff Sudan Blue II are added. The solution is filtered and then coated upon a superficially roughened aluminum foil and dried with hot air. The coating is exposed to light under a photographic negative and then placed in water at a temperature of about 95° C. for about 20 minutes. The material is again exposed to light, this time without a master, and is completely bleached out. Thus treated, it is placed in an aqueous alkaline developer solution containing 50 parts by weight of trisodium phosphate ($Na_3PO_4 \cdot 12H_2O$) to the liter and left there for about 5 minutes. With the aid of a cotton pad, a plush swab or a cellulose hydrate sponge, the parts of the coating which were not affected by the light during the first, imagewise exposure are removed. A reversal image is obtained. If the same light-sensitive coating is used but the fixing treatment is omitted, a reversal image is not obtained.

Instead of 0.5 to 1.5 parts by weight of "Mowilith" 90, the same number of parts by weight of polyvinyl butyral ("Mowital" B–60–T), polyvinyl formal ("Mowital" R–F–40) or cellulose ethyl (or benzyl) ether may be used. Instead of 1.5 parts by weight of 2,3,4-trihydroxy benzophenone naphthoquinone-(1,2)-diazide-(2)-4 (or 5)-sulfonic acid ester and 1.5 parts by weight of 2,3,4-trihydroxybenzophenone naphthoquinone - (1,2)-diazide-(2)-4 (or 5)-sulfonic acid bis-ester, 3 parts by weight of the condensation product from 1 mole of 2,4,2′,4′-tetrahydroxy-6,6′-dimethyl-diphenyl methane and 2 moles of a naphthoquinone-(1,2)-diazide-(2)-4 (or 5) sulfonyl chloride can be used with equivalent results. The resultant reversal image on the aluminum foil is inked up with greasy ink in the usual way and serves as printing plate for planographic and offset printing.

*Example XVII*

1.5 parts by weight of polyvinyl acetate of high molecular weight ("Mowilith" 90) and 10 parts by weight of a m-cresol-formaldehyde resin novolak ("Alnovol" 429K) are dissolved in 100 parts by volume of ethylene glycol monoethyl ether. 0.5 part by weight of Sudan Blue II and 3 parts by weight of 2,3,4-trihydroxybenzophenone-naphthoquinone-(1,2)-diazide-(2)-4 (or 5)-sulfonic acid ester are added and the solution is filtered and then coated upon a copper plate that has been polished smooth. After the plate has been exposed under a diapositive, for the production of the reversal image, it is placed in water at a temperature of about 95° C. for about 30 minutes. It is again exposed, this time without a master, and completely bleached out. Thus treated, the copper plate is placed in an aqueous alkaline developer solution containing 50 parts by weight of trisodium phosphate ($Na_3PO_4 \cdot 12H_2O$) to the liter, where it is left for about 5 minutes, and the parts of the coating which were not affected by the light during the first, imagewise exposure are removed with the aid of a cotton pad, a plush swab or a cellulose hydrate sponge. A reversal image is obtained. If the same light-sensitive coating is used but the fixing treatment is omitted, a reversal image is not obtained after the treatment with the alkaline developer solution.

The copper surface, now bared imagewise, is deep-etched at 20–22° C. with an iron-III-chloride solution of 40° Bé. A printing plate for intaglio printing is obtained. Instead of "Mowilith" 90, "Mowilith" 70 (molecular weight: 1,000,000) can be used.

*Example XVIII*

The procedure described in Example XVII is followed but, instead of the copper plate, a bimetal foil made of aluminum and copper is used. A photographic negative is used as master and, for the production of the reversal image, after the exposure the material is placed in nearly boiling water for about 20 minutes. It is again exposed, this time without a master, and completely bleached out. It is then placed in an aqueous alkaline solution containing about 2.5 parts by weight of lithium hydroxide to the liter, where it is left for about 4 minutes, and the parts of the coating which were not affected by the light during the first, imagewise exposure are removed with the aid of a cotton pad, a plush swab or a cellulose hydrate sponge. A reversal image is obtained. If the same light-sensitive coating is used but the fixing treatment is omitted, a reversal image is not obtained.

The copper surface, now bared imagewise, is etched at 20–22° C. with an iron nitrate solution containing 160 parts by weight of $Fe(NO_3)_3.9H_2O$ in 100 parts by volume of water. A printing plate for planographic and offset printing is obtained. Instead of an aluminum and copper foil, a bimetal foil of steel and copper can be used with equally good results. Instead of the light-sensitive compounds used in Examples IV and V, 3 parts by weight of the condensation product from 1 mole of 2,2′-dihydroxydiphenyl and 1 mole of a naphthoquinone-(1,2)-diazide-(2)-4 (or 5)-sulfonyl chloride or 1 mole of 1,2-dihydroxy anthraquinone and 1 mole of a naphthoquinone-(1,2)-diazide-(2)-4 (or 5)-sulfonyl chloride can be used with equivalent results.

*Example XIX*

The procedure described in Example XVII is followed but, instead of the copper plate, a metal foil consisting of aluminum, copper and chromium layers is used. A diapositive is used as master and, after the exposure to produce the reversal image, the plate is placed in boiling water for about 25 minutes. It is again exposed, this time without a master, and is completely bleached out. It is then placed in an aqueous alkaline solution containing 2.5 parts by weight of potassium hydroxide to the liter, where it is left for about 5 minutes, and the parts of the coating which were not affected by the light during the first, imagewise exposure are removed with the aid of a cotton pad, plush swab or cellulose hydrate sponge. A reversal image is obtained. If the process is carried out with the same light-sensitive solution but without the fixing treatment, a reversal image is not obtained.

The chromium surface which is imagewise bared is etched by means of a mixture consisting of calcium chloride, glycerine and hydrochloric acid, e.g., in accordance with the method of U.S. Patent 2,687,345, whereby the copper surface beneath the chromium layer is not attacked. A printing plate for planographic and offset printing is obtained in which the printing elements consist of copper while the non-printing parts are of chromium.

*Example XX*

The procedure described in Example XVII is followed, but instead of the copper plate a copper foil of a thickness of about 30–70$\mu$ laminated to a plastic foil that is not electrically conductive is used. After being exposed under a photographic negative, for the production of the reversal image, the material is placed in boiling water for about 20 minutes. It is again exposed to light, this time without a master, and completely bleached out. It is then placed in an aqueous alkaline solution containing 5 parts by weight of sodium hydroxide to the liter, where it is left for about 3 minutes, and the parts of the coating that were not affected by the light during the first, imagewise exposure are removed wih the aid of a cotton pad, a plush swab or a cellulose hydrate sponge. A reversal image is obtained. If the same light-sensitive coating is used but the fixing treatment following the first exposure is omitted, a reversal image is not obtained.

The bared copper surface is etched at 18–22° C. with an iron-III-chloride solution of 40° Bé. A printed circuit for the conduction of electric current is obtained. Instead of a copper foil laminated to a non-conductive plastic plate, a transparent or matted plastic foil that is provided with a metal surface by vacuum deposition (thickness: e.g., 1$\mu$) can be used as base with equally good results. Component parts for the construction of electrical apparatuses are obtained.

*Example XXI*

1.5 parts by weight of polyvinyl acetate ("Mowilith" 90), 3 parts by weight of 2,3,4-trihydroxy benzophenone naphthoquinone-(1,2)-diazide-(2)-4 (or 5)-sulfonic acid ester and 0.5 part by weight of Sudan Blue II are dissolved in 100 parts by volume of toluene. The solution is filtered and then coated upon a superficially saponified cellulose acetate foil. Exposure is effected with a photographic negative as master until the material where not protected by the master is fully bleached out. For the production of the reversal image, the exposed foil is then placed in water at a temperature of about 95° C. for about 30 minutes. It is again exposed to light, this time without a master, until fully bleached out. It is then placed in an aqueous alkaline solution containing 5 parts by weight of sodium hydroxide per liter, where it is left for about 5 minutes, and the parts of the coating which were not affected by the light during the first, imagewise exposure are removed with the aid of a cotton pad, plush swab or cellulose hydrate sponge. A reversal image is obtained. If the same process is carried out with the same light-sensitive solution but without the fixing treatment, a reversal image is not obtained. A printing plate for planographic and offset printing is obtained.

*Example XXII*

1.5 parts by weight of polyvinyl acetate ("Mowilith" 90), 3 parts by weight of 2,3,4-trihydroxybenzophenone naphthoquinone-(1,2)-diazide-(2)-4 (or 5)-sulfonic acid ester and 0.5 part by weight of Sudan Blue II are dissolved in 100 parts by weight of ethylene glycol monoethyl ether. The solution is filtered and then coated upon a transparent foil of polyethylene terephthalate. For the production of the reversal image, after the exposure under a photographic negative, the material is placed in water at a temperature of about 95° C. for 30 minutes. It is again exposed to light, this time without a master, and fully bleached out. It is then placed in an aqueous alkaline solution containing 55–60 parts by weight of sodium metasilicate ($Na_2SiO_3 \cdot 9H_2O$) and 33–37 parts by weight of trisodium phosphate $$(Na_3PO_4 \cdot 12H_2O)$$

per liter. The exposed material is left in this aqueous alkaline bath for about 2 minutes and the surface of the coating is treated with a cotton pad, plush swab or cellulose acetate sponge, as a result of which only the parts of the coating which were not affected by the light during the first, imagewise exposure are removed. A reversal image is obtained. If the process is performed with the same light-sensitive solution but without the fixing treatment, a reversal image is not obtained. Instead of a polyethylene terephthalate foil, a transparent cellulose acetate foil can be used with the same result.

It will be obvious to those skilled in the art that many modifications may be made within the scope of the present invention without departing from the spirit thereof, and the invention includes all such modifications.

What is claimed is:

1. A reversal-development process which comprises exposing to a light image a supported layer comprising at least one naphthoquinone-(1,2)-diazide compound and at least one film-forming thermoplastic material of high molecular weight selected from the group consisting of water-insoluble cellulose ethers, polyvinyl esters, and polyvinyl acetals, treating the exposed layer with a member of the group consisting of water and an alkaline solution, exposing the entire layer to light, and treating the exposed layer with an alkaline developer, whereby those portions thereof which were not struck by light during the first exposure are removed.

2. A process according to claim 1 in which the first treatment of the layer is effected at elevated temperature.

3. A process according to claim 1 in which the layer contains an additional resin resistant to strong inorganic acids.

4. A process according to claim 3 in which the resin is a novolak.

5. A process according to claim 1 in which the layer contains a salt of a multivalent metal.

6. A light-sensitive material comprising a base material having a layer directly bonded thereon, the layer consisting essentially of at least one naphthoquinone-(1,2)-diazide compound and at least one film-forming thermoplastic material of high molecular weight selected from the group consisting of water-insoluble cellulose ethers, polyvinyl esters, and polyvinyl acetals.

7. A light-sensitive material according to claim 6 in which the layer contains an additional resin resistant to strong inorganic acids.

8. A light-sensitive material according to claim 7 in which the resin is a novolak.

9. A light-sensitive material according to claim 6 in which the layer contains a salt of a multivalent metal.

10. A process according to claim 1 in which the first treatment of the layer is effected by dipping and the second treatment of the layer is effected by wiping.

11. A process according to claim 1 in which the naphthoquinone-(1,2)-diazide compound is selected from the group consisting of monoesters and diesters of naphthoquinone-(1,2)-diazide-(2)-4-sulfonic acid and naphthoquinone-(1,2)-diazide-(2)-5-sulfonic acid esterified with a polyhydroxy compound selected from the group consisting of 2,3,4-trihydroxybenzophenone, 2,2',4,4'-tetrahydroxy-diphenyl, 2,2',4,4'-tetrahydroxy-6,6'-dimethyl diphenyl methane, 1,2-dihydroxy-anthraquinone, 1,7-dihydroxy naphthalene, 2,7-dihydroxy naphthalene, 2,2'-dihydroxy-1,1'-dinaphthyl methane, 2,2'-dihydroxydiphenyl, phloroglucinol and purpurogallin.

12. A light-sensitive material according to claim 6 in which the naphthoquinone-(1,2)-diazide compound is selected from the group consisting of monoesters and diesters of naphthoquinone-(1,2)-diazide-(2)-4-sulfonic acid and naphthoquinone-(1,2)-diazide-(2)-5-sulfonic acid esterified with a polyhydroxy compound selected from the group consisting of 2,3,4-trihydroxy-benzophenone, 2,2',4,4'-tetrahydroxy-diphenyl, 2,2',4,4'-tetrahydroxy-6,6'-dimethyl diphenyl methane, 1,2-dihydroxy-anthraquinone, 1,7-dihydroxy naphthalene, 2,7-dihydroxy naphthalene, 2,2'-dihydroxy-1,1'-dinaphthyl methane, 2,2'-dihydroxydiphenyl, phloroglucinol and purpurogallin.

References Cited by the Examiner

UNITED STATES PATENTS

| | | | |
|---|---|---|---|
| 2,480,749 | 8/1949 | Marks | 96—115 |
| 2,500,023 | 3/1950 | Burk | 96—115 |
| 2,667,415 | 1/1954 | Neugebauer et al. | 96—3 |
| 2,772,972 | 12/1956 | Herrick et al. | 96—91 |
| 2,930,691 | 3/1960 | Tull | 96—33 |
| 2,993,788 | 7/1961 | Straw et al. | 96—49 X |
| 2,995,442 | 8/1961 | Schmidt et al. | 96—91 |
| 3,032,414 | 5/1962 | James et al. | 96—75 X |
| 3,046,120 | 7/1962 | Schmidt et al. | 96—91 |
| 3,046,121 | 7/1962 | Schmidt | 96—91 |
| 3,050,387 | 8/1962 | Neugebauer et al. | 96—91 |
| 3,061,430 | 10/1962 | Uhlig et al. | 96—91 |
| 3,130,047 | 4/1964 | Uhlig et al. | 96—91 |

NORMAN G. TORCHIN, *Primary Examiner.*

ALEXANDER D. RICCI, *Examiner.*

R. L. STONE, *Assistant Examiner.*